May 30, 1939.  N. R. KRAUSE  2,160,508
LUBRICATING DEVICE
Filed Jan. 11, 1937
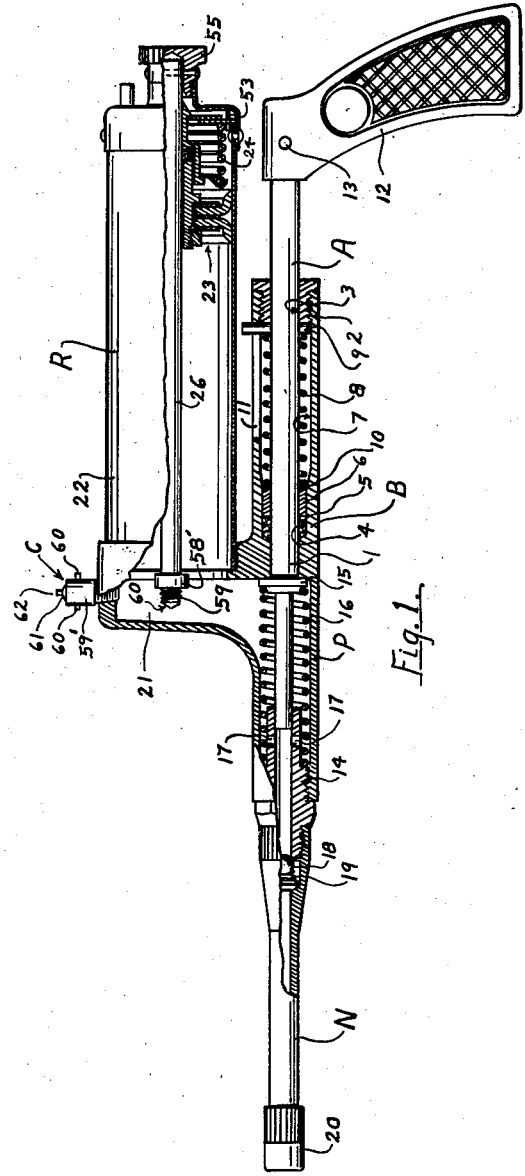
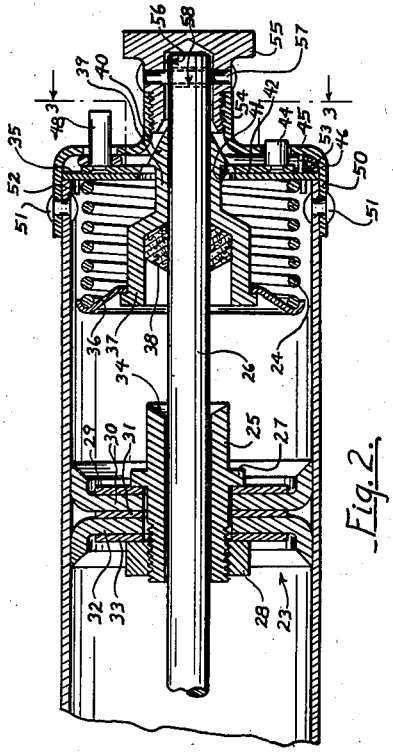
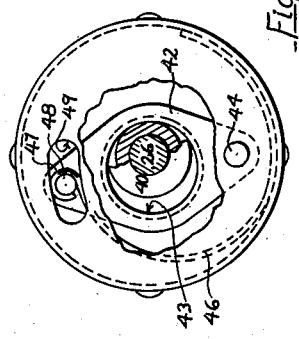
INVENTOR.
Norman R. Krause,
BY James A. Walsh,
ATTORNEY.

Patented May 30, 1939

2,160,508

UNITED STATES PATENT OFFICE 2,160,508

LUBRICATING DEVICE

Norman R. Krause, Racine, Wis.

Application January 11, 1937, Serial No. 119,963

12 Claims. (Cl. 221—47.3)

The present invention relates to lubricant dispensers of the grease pump type, and an object thereof is to generally improve the construction and operation of devices of this type.

A further object is to provide, in such a device, an improved reservoir; improved means for maintaining the lubricant in the reservoir under pressure; for removing the pressure from the fluid when desired; and for preventing leakage of the fluid from the reservoir.

A further object is to provide means for charging the reservoir with lubricant; to provide improved pumping or lubricant ejecting means; and to arrange the pumping means to operate as a relieving device for excessive pressure in the event that such is developed by the charging means.

Further objects and advantages will be apparent from the following description and accompanying drawing in which:

Fig. 1 is a side elevation, partly in vertical axial section, of a device embodying my improvements.

Fig. 2 is an enlarged vertical sectional view showing certain mechanism indicated in Fig. 1.

Fig. 3 is a sectional view taken on the line 3—3 of Fig. 2.

Similar reference characters have been applied to the same parts throughout the drawings and specification.

As seen in Fig. 1, the device comprises generally a body portion B, in which is reciprocably arranged an actuating plunger A, abutting a pump plunger P, which expels lubricant through a nozzle N, the lubricant being contained in a reservoir R, the reservoir being recharged in any of a variety of ways, conveniently through a charging fitting C.

Body portion B is provided with a bore 1 in approximately the mid-portion thereof, in which actuating plunger A is freely reciprocable, a bushing 2 being threaded or otherwise fixed in the body portion at a distance from bore 1, and providing a bore 3 for guiding the plunger. A larger bore 4 adjacent to bore 1 contains a quantity of packing 5, compressed about plunger A by means of a follower 6, the whole forming a gland or stuffing box about the plunger to revent leakage of lubricant into a bore 7, adjoining bore 4, and preferably of somewhat larger diameter. A spring 8 is arranged in bore 7 between follower 5 and a pin 9, transversely arranged in plunger A, so as to urge the plunger in one direction and the follower in the other, a washer 10 being interposed between the follower and spring if desired. In this way a continuous pressure is maintained on the follower to hold the packing compressed about the rod, and also a retracting pressure is continuously exerted, tending to return the plunger to starting position after each stroke.

Pin 9 extends outwardly through the wall of body portion B, being slidable in a slot 11 which prevents turning of the body portion about the plunger. A pistol grip or handle 12 is suitably fixed with the plunger, as by a pin 13, by which the whole instrument is carried and manipulated.

Plunger P is slidable in a substantially fluid-tight manner in a barrel or cylinder element 14 suitably fixed with the extremity of body portion B opposite bushing 2, and preferably has a head 15 engageable with the end of actuating plunger A, and urged toward the right as seen in the figure by a spring 16, engaged, for example, between the head and a portion of cylinder element 14. The cylinder provides an inlet port or ports 17—17 so located as to be covered by the plunger during the major portion of its travel, but to be uncovered when the plunger is fully retracted so that grease from the space about the cylinder may flow into the void left therein by the retreating plunger.

At the discharge end of cylinder 14 a ball or other suitable valve element 18 is positioned to close the exit, being yieldably held in position by a spring 19, engaged between the ball and a convenient portion of nozzle N. Forward movement of the plunger P caused by thrust on plunger A through handle 12 will expel grease in cylinder 14 as soon as the end of the plunger passes ports 17—17, the pressure raising ball 18 off of its seat on the cylinder by compressing spring 19, and the grease flowing past the ball into nozzle N. Upon retraction of plunger A, spring 16 retracts plunger P against the vacuum formed in the cylinder, the grease being prevented from returning from nozzle N by valve element 18, the spring being made sufficiently strong to do this, and grease flows into the cylinder through ports 17—17 as soon as they are uncovered by the plunger end.

A suitable chuck portion 20 is fixed to the nozzle N, and may be arranged for cooperation with any desired form of grease receiving fitting, or for discharging grease in locations where it is inconvenient or undesirable to provide fittings.

Body portion B is preferably provided with an ante-chamber 21 having threaded or otherwise removably fixed therewith a reservoir cylinder or member 22 which is arranged to contain grease under a light pressure in readiness for charging cylinder 14, and various means are contemplated for replenishing the reservoir. Above mentioned fitting C preferably opens into ante-chamber 21, and, when a source of grease under high pressure is available, the reservoir may be recharged by merely introducing the grease through the fitting in well known manner.

It will be noted that, during this operation, the plunger P is normally retracted so that ports 17 are open to ante-chamber 21, and that, under these conditions whatever pressure is developed in the chamber is communicated directly through cylinder 14 to ball valve element 18. The pressure available from any high-pressure grease source is enormously higher than that designed to be maintained in reservoir 22, and, in the present instance the pressure of valve-spring 19 is so chosen that the ball will be forced from its seat and grease will be allowed to escape through nozzle N before a pressure is built up in the reservoir sufficient to endanger the structure. Thus, not only is the reservoir protected from bursting stresses, but the operator is apprized of the fact that the reservoir is full by the escape of grease from the nozzle.

Pressure is maintained on the grease in reservoir R by a piston generally designated as 23, which is indirectly urged against the grease by a spring 24, which may be latched back as shown when it is desired to remove the pressure for any reason.

As more particularly shown in Fig. 2, piston 23 comprises an inner sleeve or gland element 25, preferably loosely slidable on a rod 26 extending axially through the reservoir for a purpose to appear, the sleeve having a flange 27, between which and a nut 28, are clamped in the order mentioned, a metallic or other suitable washer 29, a cup leather 30, a washer 31, a cup leather 32, and a washer 33. Other suitable constructions of piston are contemplated as equivalent, the chief requirements being that they shall be substantially fluid-tight under moderate pressure. The surface 34 of the sleeve forms part of a stuffing box to prevent leakage about the rod 26.

Spring 24 is arranged between a latch-plate 35 and a movable collar 36 engaged with a gland element 37, also slidable on rod 26, the same containing a quantity of packing 38 and having a backwardly extending neck portion 39. The neck portion has at its extremity a conical or other suitable head 40 having a shoulder 41 which may be engaged by a latch 42 for holding the gland element, collar and spring retracted so as to remove the spring pressure from piston 23. As will be apparent, when the head is not engaged by the latch, the whole assembly including the gland element will be forced to the left as seen in Fig. 2, packing 38 being compressed between surface 34 on sleeve 25, and the walls of gland element 37, this force compressing it about rod 26, and providing a fluid-tight seal where it passes through the piston. This force also forces piston 23 to the left until it is arrested by the pressure set up in the grease.

Latch 42 comprises a plate provided with a central opening 43, Fig. 3, large enough for head 40 to pass through. The latch lies in face-to-face contact with latch plate 35 and is pivoted by means of a pin 44 extending backwardly through a cylinder head 45, so as to swing to one side to engage the shoulder 41 as shown particularly in Fig. 3. The latch is spaced from the cylinder head by means of a C-spring 46 having an end portion 47 engaged about a pin 48 fixed with the latch and projecting through a slot 49 in the cylinder head so that it may be manually engaged for shifting the latch when it is desired to release the head 40, and apply pressure to piston 23.

Cylinder head 45 may be fixed with the cylinder 22 in any desired manner, in the present instance a flange or rim 50 encircling the cylinder, and a plurality of rivets 51—51 being provided for permanently connecting the parts. Latch plate 35 is preferably provided with forwardly projecting ears or lugs 52 for centering spring 24, and rearwardly projecting lugs 53 engaging the cylinder head for spacing the plate therefrom to prevent the thrust of spring 24 from crowding latch 42 and interfering with free movement thereof. As seen in Fig. 2, plate 35 engages the shoulder formed by the end of cylinder 22 which prevents displacement of the plate in the opposite direction.

The cylinder head has a neck portion 54 which is preferably internally threaded for the reception of a grip or button 55 provided with an internal bore 56 into which above mentioned rod 26 extends, there being substantial clearance about the rod to permit "floating" thereof to accommodate slight variations in the concentricity of the sliding parts with cylinder 22, or other unavoidable inaccuracies in manufacture. A pin 57 extends transversely of bore 56 and through a bore 58 in the rod, the pin being loose in the latter bore for the same purpose.

Rod 26 has a collar 58' adjacent the end opposite grip 55, and it is threaded at 59 for engaging a piston in a grease cartridge when it is desired to fill the gun in the manner disclosed in applicant's prior Patent No. 1,956,073, and the end is pointed at 60 to more readily break the seal at the end of the cartridge.

To fill the gun according to this system the cylinder 22 is removed from the chamber 21 and grip 55 is disengaged from neck 54, after which the rod 26 may be drawn to the right as seen in Figs. 1 and 2, collar 58' engaging sleeve 25 and sliding the piston and gland element 37 also to the right, and compressing spring 24. When the parts reach nearly the position shown in Fig. 1, the conical head 40 pushes aside latch 42 against the resistance of spring 46 and passes through, the latch then engaging shoulder 42 and preventing return of the gland element and spring.

The cartridge may then be inserted in the cylinder and the rod plunged forward through the grease in accordance with the teaching of the above mentioned patent. The cylinder is then again fixed to the ante-chamber 21 and the latch disengaged from shoulder 41 by means of pin 48 to apply the spring pressure to the reservoir.

For certain kinds of lubricant or for other reasons it is sometimes desirable to avoid pressure in the reservoir, and under these conditions the latch may be allowed to remain in engagement with the shoulder when piston 23 will follow up the grease under the influence of atmospheric pressure in the manner common in certain types of guns.

In reservoirs of this general type there has been difficulty in the past with leakage of fluid along the rod under the influence of the spring pressure especially during extended periods of non-use. In the present invention this is effectively prevented by the packing 38, which, as above explained, is constantly compressed by the pressure of spring 24 whenever there is pressure in the chamber.

The freedom of movement provided in rod 26 and the fact that it is anchored at one end only prevents any binding in piston 23, even in the event of slight inaccuracies in the concentricity of the bore common in structures of this type.

Charging fitting C may be of any suitable type, conveniently consisting of a fitting for the reception of a chuck of the type customarily associated with a high-pressure grease line, and having a body portion 59' fixed in any suitable manner with the grease reservoir, for example on the ante-chamber 21, the illustrated type including a pin or pins 60—60 for engaging such a chuck and holding it in position.

Body portion 59' includes a spring-pressed valve element or ball 61 opening inwardly to admit lubricant from the grease line, but to prevent its escape under the pressure of piston 23 when the line is removed. The valve may be unseated by atmospheric pressure when it is desired to retract the piston 23 prior to removing cylinder 22 from chamber 21, and, for venting the reservoir for any reason, as when it is desired to allow the piston 23 to return toward chamber 21 to restore the pressure on the lubricant, after a period of non-use with the piston retracted, valve 61 may be unseated by pressing on a pin 62. Pin 62 may be utilized if desired for unseating the valve for admitting air to the reservoir.

While the construction described is preferred it is to be understood that the invention is not limited except as defined in the annexed claims. The above being a complete description of an illustrative embodiment of the invention, what is claimed as new, and desired to be secured by Letters Patent of the United States is:

1. In a grease gun having a reservoir a rod floatably mounted and extending substantially axially in the reservoir, a piston providing an opening through which the rod extends, said piston being slidable in the reservoir, a follower element, a spring arranged to urge said follower element into contact with the piston, means for latching the follower element at one end of the reservoir, and means on the rod engageable with the piston for retracting the same and forcing the follower element into latching position against the spring pressure, packing interposed between the follower and piston and arranged to be forced into sealing contact with the rod by the spring pressure.

2. In a grease gun having a reservoir a rod floatably mounted and extending substantially axially in the reservoir, a piston providing an opening through which the rod extends, said opening being of a size substantially larger than the rod whereby said rod will have freedom for lateral movement in the piston, said piston being slidable in the reservoir, a follower element, a spring arranged to urge said follower element into contact with the piston, means for latching the follower element at one end of the reservoir, and means on the rod engageable with the piston for retracting the same and forcing the follower element into latching position against the spring pressure.

3. In a grease gun having a reservoir, a rod extending lengthwise of the reservoir, a piston slidable in the reservoir, and through which the rod extends, a follower element, a spring arranged to urge said follower toward said piston, sealing means on said follower and sealing means on said piston, said sealing means being positioned respectively on said follower and piston so as to be forced into contact with each other by the spring pressure and arranged to seal the opening in the piston about the rod, and means on the rod for retracting the piston and follower.

4. In a grease gun having a reservoir a rod mounted substantially axially in the reservoir for floating movement in the reservoir, a piston providing an opening through which the rod extends, said piston being slidable in the reservoir and on the rod, a follower element normally spring-urged into contact with the piston, means for latching the follower element at one end of the reservoir, means on the rod engageable with the piston for retracting the same and forcing the follower element into latching position against the spring pressure, a gland element on the piston and a cooperating gland element on the follower, said gland elements being so positioned on said piston and follower, respectively, as to be forced into mating contact by the spring pressure, the floating movement of the rod allowing the piston to freely traverse the reservoir regardless of slight inaccuracies in the concentricity of the reservoir and piston opening.

5. In a grease gun having a reservoir and a rod mounted substantially axially in the reservoir, a piston providing an opening through which the rod extends, said piston being slidable in the reservoir, a follower element normally spring-urged into contact with the piston, means for latching the follower element at one end of the reservoir, means on the rod engageable with the piston for retracting the same and forcing the follower element into latching position against the spring pressure, a gland element on the piston and a cooperating gland element on the follower, said gland elements being so positioned on said piston and follower, respectively, as to be forced into mating contact by the spring pressure.

6. In a grease gun having a reservoir a piston slidable in the reservoir, a follower element normally spring-urged into contact with the piston, means for withdrawing grease from the reservoir including a pump having a passageway communicating with the reservoir, spring loaded check valve arranged to control the flow of fluid through the passageway to discharge from the pump, and means for receiving grease under pressure into the reservoir for forcing the piston and follower to traverse the reservoir against the spring pressure, the loading of the check valve being predetermined and such as to resist the flow of grease sufficiently to prevent flow thereof from the passageway under normal pressure in the reservoir, but to yield in the event of development of excessive pressure in the reservoir by introduction of grease through said means.

7. In a grease gun having a reservoir a rod mounted substantially axially in the reservoir for floating movement in the reservoir, a piston providing an opening through which the rod extends, said opening being of a size substantially larger than the rod whereby said rod will have freedom for lateral movement in the piston, said piston being slidable in the reservoir, a follower element, a spring normally urging the follower element into contact with the piston, and means on the rod engageable with the piston for retracting the same and forcing the follower element to traverse the reservoir against the spring pressure, the floating movement of the rod allowing the piston to freely traverse the reservoir regardless of slight inaccuracies in the concentricity of the reservoir and piston opening.

8. In a grease gun having a reservoir a rod mounted substantially axially in the reservoir for floating movement in the reservoir, a piston providing an opening through which the rod extends, there being substantial clearance between the piston and rod, said piston being slidable in the reservoir and on the rod, a follower element, a spring arranged to normally urge said follower element into contact with the piston, means on the rod engageable with the piston for retracting the same and forcing the follower element to traverse the reservoir against the spring pressure, the floating movement of the rod and the loose fit of the opening about the rod allowing the piston to freely traverse the reservoir regardless of slight inaccuracies in the concentricity of the reservoir and piston opening.

9. In a grease gun having a reservoir a rod mounted substantially axially in the reservoir for floating movement in the reservoir, a piston providing an opening through which the rod extends, there being clearance between the piston and rod, said piston being slidable in the reservoir and on the rod, a follower element, a spring arranged to urge said element into contact with the piston, means on the rod engageable with the piston for retracting the same and forcing the follower element to traverse the reservoir against the spring pressure, a gland element on the piston, and a cooperating gland element on the follower, said gland elements being so positioned on said piston and follower, respectively, as to be forced into mating contact by the spring pressure, the floating movement of the rod and the loose fit of the opening about the rod allowing the piston to freely traverse the reservoir regardless of slight inaccuracies in the concentricity of the reservoir and piston opening.

10. In a grease gun having a reservoir a rod mounted substantially axially in the reservoir for floating movement in the reservoir, a piston providing an opening through which the rod extends, said piston being slidable in the reservoir and on the rod, a follower element, a spring arranged to urge said element into contact with the piston, means on the rod engageable with the piston for retracting the same and forcing the follower element to traverse the reservoir against the spring pressure, a gland element on the piston, and a cooperating gland element on the follower, said gland elements being so positioned on said piston and follower, respectively, as to be forced into mating contact by the spring pressure, the floating movement of the rod allowing the piston to freely traverse the reservoir regardless of slight inaccuracies in the concentricity of the reservoir and piston opening.

11. In a grease gun having a reservoir a rod mounted axially in the reservoir, a piston providing an opening through which the rod extends, said piston being slidable in the reservoir and on the rod, a follower element, a spring arranged to urge said follower element into contact with the piston, means on the rod engageable with the piston for retracting the same and forcing the follower element to traverse the reservoir against the spring pressure, a gland element on the piston, and a cooperating gland element on the follower, said gland elements being so positioned on said piston and follower, respectively, as to be forced into mating contact by the spring pressure.

12. In a grease gun having a reservoir cylinder, a rod disposed substantially axially in the reservoir and anchored thereto at one end, means for so anchoring the rod arranged to provide limited angular movement and limited bodily displacement so that the rod may take a position eccentric to the reservoir, at an angle to the axis thereof, or a position representing a combination of these positions, a piston through which the rod extends, said piston being slidable in the reservoir, spring means arranged to urge the piston in one direction to apply continuous pressure to material in the reservoir, and means on the rod engageable with the piston for retracting the same and forcing it to traverse the cylinder against the spring pressure, the floating movement of the rod provided by the anchoring means allowing the piston to freely traverse the reservoir regardless of slight inaccuracies in the concentricity of the reservoir and piston opening.

NORMAN R. KRAUSE.